United States Patent [19]

Sufi

[11] Patent Number: 4,904,703

[45] Date of Patent: Feb. 27, 1990

[54] HIGH TEMPERATURE FOAM

[75] Inventor: Aniq Sufi, Fountain Valley, Calif.

[73] Assignee: SMS Associates, Carlsbad, Calif.

[21] Appl. No.: 281,203

[22] Filed: Dec. 7, 1988

[51] Int. Cl.$^4$ .............................................. C08J 9/16
[52] U.S. Cl. .................................. 521/135; 521/163;
 521/902; 521/906
[58] Field of Search ................ 521/135, 163, 902, 906

[56]  References Cited

U.S. PATENT DOCUMENTS

| | | | |
|---|---|---|---|
| 4,221,875 | 9/1980 | Yakuta | 521/163 |
| 4,421,868 | 12/1983 | Smith | 521/163 |
| 4,427,797 | 1/1984 | Smith | 521/163 |
| 4,644,015 | 2/1987 | Scaccia et al. | 521/163 |
| 4,777,187 | 10/1988 | Weber et al. | 521/163 |
| 4,789,690 | 12/1988 | Milovanovic-Lerik et al. | 521/163 |

*Primary Examiner*—Morton Foelak
*Attorney, Agent, or Firm*—Lieberman, Rudolph & Nowak

[57] ABSTRACT

A highly temperature resistant foam useful for insulating is disclosed. The foam is particularly useful for insulating stem pipes, hot water heaters and refinery and chemical processing plant pipes. The foam insulation utilizes a cross-linking agent comprised of melamine, which may be dissolved in an alcoholic base. The foam may also include an aromatic polyester polyol, a chlorinated polyester polyol, a nonyl phenol ethoxylate, a silicone based surfactant, and isocyanurate catalyst, a density controlling agent and polymeric isocyanate.

The foam will stand consistent temperatures as high as 400° F. It is suitable for spray or poured applications and may be frothed during application.

8 Claims, No Drawings

1

HIGH TEMPERATURE FOAM

BACKGROUND OF THE INVENTION

High temperature insulating foams are useful primarily for pipe insulation. Most chemical processing facilities, industrial and residential buildings use some form of foam insulation. In refineries and chemical processing plants, superheated steam is frequently used which is generally above 400° F.

In the past, fiberglass insulation and calcium silicate insulation have served as the primary insulating materials in commercial and residential applications. Unfortunately, these insulating materials degrade over long term exposure to high temperatures. Additionally, these materials are susceptible to water or moisture, which reduces the insulating value substantially.

With respect to isocyanate foams having an initial K factor of about 0.14 to 0.15, fluorocarbon gas tends to migrate out of the insulating cells, causing the conductivity to increase and corresponding resistance to heat transfer to decrease.

SUMMARY OF THE INVENTION

An insulating foam is disclosed containing an isocyanate component (a) and a resin and additive component (b), said isocyanate component (a) comprising a polymeric isocyanate in an amount ranging from 90 to 100% of component (a), and an epoxy resin in an amount ranging from 0 to 10% of component (a); and the resin and additive component (b) comprising a chlorinated polyester polyol, in an amount ranging from 20 to 40 percent of component (b), melamine present in an amount ranging from 23.5 to 25% of component (b), an isocyanurate catalyst present in an amount effective to catalyze the conversion of isocyanate present in component (a) to isocyanurate, and a density controlling agent in an amount sufficient to provide a density to the final composition of from about 2 to about 5, said components (a) and (b) being combined in a relative concentration of 75 parts (a) to 25 parts (b).

Also described herein is a method of making a high temperature foam which will withstand temperatures as high as about 400° F. which comprises the addition of melamine powder to the foam composition.

DETAILED DESCRIPTION

The invention described herein utilizes commercially available ingredients to achieve an unexpectedly superior, highly temperature resistant insulating foam. In particular, the foam resists degradation at temperatures greater than 400° F. It is made by formulating two component parts, an "isocyanate" or "first" component and a "resin and additive" or "second" component, and by combining the two components in relative amounts of 75:25. The components are admixed shortly before the foam is applied.

The isocyanate component contains a polymeric isocyanate in an amount (on a weight/weight basis), based upon the total weight of the isocyanate portion. A preferred polymeric isocyanate is one which is a polymethylene polyphenyl isocyanate, such as those commercially available from Mobay Chem. Co. (Mondur Mr), BASF (M20S), Dow Chemical Co (PAPI 130, 127 and 135), and ICI (Rubinate M). Polymeric isocyanate functionalities range generally from 2 to 3. A preferred polymeric isoyamate for the invention described herein has a functionality of 2.3 to 3. The polymeric isocyanate may be present in an amount ranging from about 90% to about 100% of the isocyanate component. The preferred amount of polymeric isocyanate is 95% w/w, based upon the total weight of the isocyanate component.

The isocyanate component may also contain epoxy resin in an amount ranging from 0 to 10% w/w. As used herein the term epoxy resin means an epichlorohydrin based epoxy resin, such as those which are commercially available from Dow Chemical Co. (DER 331) and Shell Oil Co. (EPON 828). The preferred amount of epoxy resin in the isocyanate portion is 5%.

An alternative to the epoxy resin described above which is suitable for use herein is BISPHENOL A, available commercially as BE 188. It is noted that BE 188 also contains some epichlorohydrin, and it is very useful for controlling friability in the end product.

Overall the isocyanate component should have a viscosity of 175±50 cps and a specific gravity of 122±0.01. The amine equivalent is about 140.

The second component is referred to as the "resin and additive" component, and contains numerous ingredients.

The primary ingredient in the resin and additive component is an aromatic polyester polyol. It is preferably one which is manufactured from polyethylene terphthalate. Several commercial products are available. For example, C570, available from the Chardonol Corporation, Terol 350, made by Oxit Chemicals, and Terate 203, made by Hercules, are useful aromatic polyester polyols. Aromatic polyester polyols have a functionality which ranges from 2 to 4, the preferred functionality ranging from 2.2 to 2.5. The amount of aromatic polyester polyol ranges from about 20% to about 40% w/w based upon the total weight of the resin and additive component.

Another ingredient contained in the resin and additive component is a chlorinated polyester polyol, preferably made from phthalic anhdride which is combined with chlorine and esterified with glycol. The chlorinated polyester polyol has a range of functionality of from 2 to 4, preferably from 2.2 to 2.5. The preferred chlorinated polyester polyol is commercially available from Freeman Chemical Co., and is sold under the designation 30-2158. The chlorinated polyester polyol may be present in an amount ranging from about 15% to about 25% w/w.

Yet another ingredient in the resin and additive component is a melamine resin which can be dissolved in an aliphatic alcohol. A preferred melamine resin is Cymel 327, available from American Cyanamid. The melamine resin may be present in an amount ranging from about 23.5% to about 25% and is preferably dissolved in isobutanol to aid in incorporation into the resin and additive component.

The last essential ingredient in the resin and additive component is an isocyanurate catalyst, useful for initiating the chemical reaction to form isocyanurates from isocyanates. Examples of suitable catalysts include TMR 2 and TMR by Air Products, Inc., and Curithane 52, also manufactured by Air Products, Inc. The level of catalyst is based upon the quantity of polymeric isocyanate present in the isocyanate component. For example, when the isocyanate component contains 95% polymeric isocyanate, the total isocyanurate catalyst present in the resin and additive component is about 3.5%.

Several optional ingredients may also be included in the resin and additive component, including plasticizers, surfactants and density controlling agents. Examples of suitable plasticizers include 9-mole ethoxylate of nonylphenol and nonylphenol, both of which are commercially available from Shell Oil Co., Texaco, Inc., Union Carbide Co. and numerous other manufacturers. The plasticizer is present in an amount ranging from 2 to 10%, and is most preferably present at 5%. The plasticizer may be useful for solubilizing the aromatic polyester polyol in the presence of freon gas.

An example of a suitable surfactant is a silicone surfactant, B8404, available from Goldschmidt Chemicals in West Germany. Alternatively, DC 193 from Dow Chemical Co., L5420, L5421, and L5422 from Union Carbide Co. are suitable. The silicone surfactant may be present at a relative concentration of about 1%.

Another optional ingredient is a density controlling agent, such as F11B from Dupont or a comparable alternative from Allied Chemical Co., Kaiser or Penwalt Corporation. The relative density can be varied from 2 to about 5 depending on the desired characteristics.

To prepare the high temperature foam described herein, the isocyanate component ingredients are mixed and set aside. The resin and additive component ingredients are also mixed together. Shortly prior to application, the isocyanate component and the resin and additive component are mixed together, and maybe, combined with a gas, such as freon. The foam is then applied to the insulating site and allowed to cure.

The foam may be sprayed, poured or frothed directly onto the heated elements without the need for air spaces between the heated elements and the foam insulation.

The high temperature insulating foam described herein provides a stable form of insulation which does not decompose in the presence of heat as high as 400° F. even over an extended period.

Tests conducted to evaluate the insulating ability of the foam described herein utilize a cube of foam exposed to 400° F. on all 6 sides for 60 days. The cube retains 60 to 70 percent of its physical properties. Additionally, exposure on all six sides unexpectedly shows even dimensional change characteristics, in contrast to most foams which show the greatest change in one direction or the other.

A non-limiting example of a high temperature foam falling within the scope of the invention described herein is set forth below.

EXAMPLE

| | % (w/w) |
|---|---|
| Isocyanate Component | |
| Polymeric Isocyanate | 95 |
| (Mondur MR, Mobay Chemicals) | |
| Epoxy Resin | 5 |
| (DER 331, Dow Chemical Co.) | |
| Total | 100 |
| Resin and Additive Component | |
| Aromatic Polyester Polyol | 21.0 |
| (C570, Chardonol Corp.) | |
| Chlorinated Polyester Polyol | 21.0 |
| (30-2158, Freeman Chemicals) | |
| Melamine Resin* | 23.5 |
| (Cymel 327, American Cyanamid) | |
| Plasticizer | 5.0 |
| (Nonyl phenol, 9 ethoxylate | |
| NP-9, Kalama Chemicals) | |
| Silicone Surfactant | 1.0 |
| (B8404, Goldschmidt) | |
| Isocyanurate Catalyst | |
| (TMR-2, Air Products, Inc.) | 3.0 |
| (TMR-4, Air Products, Inc.) | 0.5 |
| Density Controlling Agent | 25.0 |
| (F-11B, duPont) | |
| Total | 100% |

*Dissolved in isobutanol

Procedure

Blend the ingredients in each component, keeping the isocyanate component separate from the resin and additive component. Shortly before application, blend the isocyanate component with the resin and additive component in relative proportions of 75:25. Mix the blended components with freon, and apply the foam to an isulatable heated pipe. Allow the foam to set.

While this application has been directed to an embodiment of the preferred insulating foam, numerous alternative embodiments are contemplated as falling within the scope of the invention. Consequently the scope of this application is not to be limited thereby.

I claim:

1. An insulating foam containing an isocyanate component and a resin and additive component,
   (a) said isocyanate component containing polymeric isocyanate in an amount ranging from 90 to 100% and epoxy resin in an amount of from 0 to 10%, and
   (b) said resin and additive component containing an aromatic polyester polyol in an amount ranging from 20 to 40%;
   a chlorinated polyester polyol in an amount ranging from 20 to 40%;
   melamine in an amount ranging from 23.5 to 25%; and
   an isocyanurate catalyst in an amount effective to catalyze the quantity of isocyanate present in the isocyanate component to form isocyanurate,
   said isocyanate component and resin and additive component being blended in relative amounts of 75:25.

2. The composition of claim 1 wherein the resin and additive component is further comprised of a silicone surfactant present in an amount of 1.0 percent.

3. The composition of claim 2 wherein the resin and additive component is further comprised of a plasticizer present in an amount of 5.0 percent.

4. The composition of claim 3 further comprising a blowing agent.

5. The composition of claim 4 wherein the blowing agent is freon.

6. The composition of claim 1 wherein the polymeric isocyanate has a functionality of 2.3 to 3.

7. The composition of claim 6 wherein the chlorinated polyester polyol has a functionality of 2.2 to 2.5.

8. A method of preparing an insulating foam which will insulate temperatures greater than 400° F. comprising:
   blending a first component containing polymeric isocyanate and an epoxy resin;
   blending a second component containing a chlorinated polyester polyol, melamine and an isocyanurate catalyst, and
   combining the first and second components.

* * * * *